(12) United States Patent
Anandan et al.

(10) Patent No.: US 11,579,805 B2
(45) Date of Patent: Feb. 14, 2023

(54) METHOD AND SYSTEM FOR PROCESSING COMMANDS IN STORAGE DEVICES TO IMPROVE QUALITY OF SERVICE

(71) Applicant: Samsung Electronics Co., Ltd., Suwon-si (KR)

(72) Inventors: Anbhazhagan Anandan, Chennai (IN); Chandrashekar Tandavapura Jagadish, Mysore (IN); Suman Prakash Balakrishnan, Bengaluru (IN); Sarranya Kavitha Selvaraj, Chennai (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 27 days.

(21) Appl. No.: 17/211,093

(22) Filed: Mar. 24, 2021

(65) Prior Publication Data

US 2022/0156001 A1    May 19, 2022

(30) Foreign Application Priority Data

Nov. 18, 2020    (IN) .............................. 202041050189

(51) Int. Cl.
*G06F 3/06* (2006.01)
*G06F 9/455* (2018.01)

(52) U.S. Cl.
CPC .......... *G06F 3/0659* (2013.01); *G06F 3/0605* (2013.01); *G06F 3/0617* (2013.01); *G06F 3/0631* (2013.01); *G06F 3/0664* (2013.01); *G06F 3/0673* (2013.01); *G06F 9/45545* (2013.01)

(58) Field of Classification Search
CPC .... G06F 3/0659; G06F 3/0605; G06F 3/0617; G06F 3/0631; G06F 3/0664; G06F 3/0673; G06F 9/45545
See application file for complete search history.

(56) References Cited

U.S. PATENT DOCUMENTS 10,353,747 B2 *   7/2019   Luan ......................... G06F 9/52
11,194,619 B2 *  12/2021   Takumi ................ G06F 9/4818
(Continued)

OTHER PUBLICATIONS

Devi et al., "Load Balancing in Cloud Computing Environment Using Improved Weighted Round Robin Algorithm for Nonpreemptive Dependent Tasks", The Scientific World Journal, 2016.
(Continued)

*Primary Examiner* — Zhuo H Li
(74) *Attorney, Agent, or Firm* — Muir Patent Law, PLLC

(57) ABSTRACT

Operation of a non-volatile memory (NVM) storage module may comprise receiving a plurality of commands as associated with a plurality of priority-based queues from a host-memory. A received command is evaluated in accordance with a priority associated with the queue storing the command and a size of the command. The evaluated command is split into a plurality of sub-commands, each of the sub-commands having a size determined in accordance with the evaluation. A predetermined number of hardware resources are allocated for each of the evaluated command based on at least the size of each of the sub-commands to thereby enable a processing of the evaluated command based on the allocated resources. Quality of service (QoS) for the evaluated-command may thus be augmented.

20 Claims, 9 Drawing Sheets

(56) References Cited

U.S. PATENT DOCUMENTS

2008/0040520 A1* 2/2008 Caulkins ............... G06F 13/385
710/104
2015/0134857 A1* 5/2015 Hahn ...................... G06F 3/061
710/5

OTHER PUBLICATIONS

"NVM Express", Wikipedia article, Apr. 24, 2020.
Joshi et al., "Enabling NVMe WRR support in Linux Block Layer", Samsung Semiconductors India R&D.
NVM Express website, available at: https://nvmexpress.org/ (page provided downloaded Mar. 24, 2021).

* cited by examiner

METHOD AND SYSTEM FOR PROCESSING COMMANDS IN STORAGE DEVICES TO IMPROVE QUALITY OF SERVICE

FIELD OF THE INVENTION

The present invention relates to computing devices and in-particular to solid state storage devices.

BACKGROUND OF THE INVENTION

Storage modules, such as solid state drives (SSDs), typically use generalized models to determine optimized write and read patterns by hosts. When a host-behaviour matches these expected patterns, the best level of performance, endurance, and power consumption is exhibited by the storage module. Storage modules that can adapt their storage-algorithms with an actual rather than expected host behaviour see improved synergy with the host, resulting in better performance, endurance, and/or power consumption, as desired.

Non-Volatile Memory Express (NVMe) presents an additional dimension to this proposition. FIG. 1 represents a conventional Non-Volatile Memory Express (NVMe) specification within a computing system acting as the host 500 for the NVMe. The host 500 may include a CPU 502, memory (e.g., RAM 504) and a PCI express controller 506 providing an interface to connect to storage module(s) 508 via a PCIe Bus. Storage module 508 may comprise a processor 510, volatile memory 512 and non-volatile memory 514 (which may be configured to provide cache memory storage, high-endurance storage and/or high performance storage), In NVMe, storage module 508 may expose multiple independent queues to the host 500, allowing the host to send many operations at once to different queues of the single storage module 508. Rather than a single pipeline of optimized requests, each thread in a host may potentially send out its own command-sequences to different queues, which may not appear to match the patterns expected (and optimized for) by the storage module 508.

As per NVMe specification, the NVMe controller or the processor 510 fetches SQ-entries (submission queue entries) from submission queues maintained by host as per a selected arbitration-policy as illustrated further in FIG. 2. NVMe specification supports pre-defined criteria to perform arbitration. For example, in a Round robin algorithm acting as a part of policy adopted by Arbitration and Flash translation layer (FTL), the queues are given equal priority and commands are fetched from each queue in a cyclic-fashion or sequentially. As per another-criteria to perform arbitration, such as "weighted round robin algorithm" acting as a part of policy adopted by Arbitration and Flash translation layer (FTL), the queues are prioritized based on classes and weights. The weights allocated to the queues may be defined as (high, medium, low).

The weighted round robin criteria ensures that number of requests/commands fetched from any high-priority queues are more as compared to other lower priority-queues. For such purposes, a time-sliced operation of commands from queues of all categories is known to be performed as further depicted in FIG. 2. The time sliced operation corresponds to division of H1 into H1-1, H1-2, H1-3 for processing along different time slots among various time slots (T0 to T8). The same rationale applies to division of H2 and L1.

As a part of said weighted round robin criteria, the storage module allocates a common pool of resources for executing the tasks (applications) running at the host system (or by virtual-machines executing through the host system). Commands get executed in a time sliced operation and during such execution of a time sliced operation, 'command-priority' is not considered. For example, during a single time sliced operation, high priority commands are handled the same way as low priority command. As may be understood, as tasks differ from each other, common resources as allocated in this way may fail to optimally address priority designations. The conventional queue-handling may not optimally address time critical application needs submitted with a particular-queue.

To put it differently, the overall-resources available inside the hardware is common for commands from any priority queues during the processing operation of the NVMe devices. While constraints may be addressed by computing resource utilization first and then perform task migration by scheduling algorithms, ironically, such an exercise itself ends up occupying substantial processing, thereby proving to be an overhead. Accordingly, balancing the loads to effectively utilize the common resource availability remains a challenge.

Further, a guaranteed input-output (IO) operation as per state of the art is achieved at the cost of reserving fixed amount of resources and operated with low or negligible knowledge on traffic characteristic. In other words, multiple queues of same class are handled equally irrespective of the application needs.

SUMMARY

The present invention relates to storage systems, devices and related methods of operations. In some examples, a method of operation of a non-volatile memory (NVM) storage module comprises receiving a plurality of commands each associated with a corresponding priority from a host; for each received command, determining at least one of the corresponding priority and a size of the command; for at least some of the received commands, splitting the received command into a plurality of sub-commands in accordance with at least one of: the corresponding priority associated with the command, and the size of the command; and allocating hardware resources for each of the received commands that have been split based on the size of each of the corresponding sub-commands of the received command to thereby enable a processing of the received command based on the allocated resources.

In another embodiment, the present subject matter a non-volatile memory (NVM) storage module comprising a memory and a processor configured to perform the methods described herein. In some examples, a storage system comprises a host and the storage module described herein.

More hardware (HW) resources may be provided to process a command from a high priority queue at any point of time (i.e. during the allotted time slot) as compared to hardware provided to process a command from a low priority queue. Accordingly, latency of processing a high priority command can be reduced and/or better suited for QoS, thereby leading to an attainment of enhanced QoS. In some examples, an I/O guarantee feature may be implemented based on allocation or reservation of resources (e.g. DMA) that are fixed and independent of incoming traffic.

Along with fetching the commands based on order of priority, some examples provide priority while executing the fetched commands as well. The data transfer for a command may be processed in a time-sliced operation with a common pool of resources allocated based on the size of the command.

BRIEF DESCRIPTION OF FIGURES

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention will be described below in detail with reference to the accompanying drawings.

Figure 1:
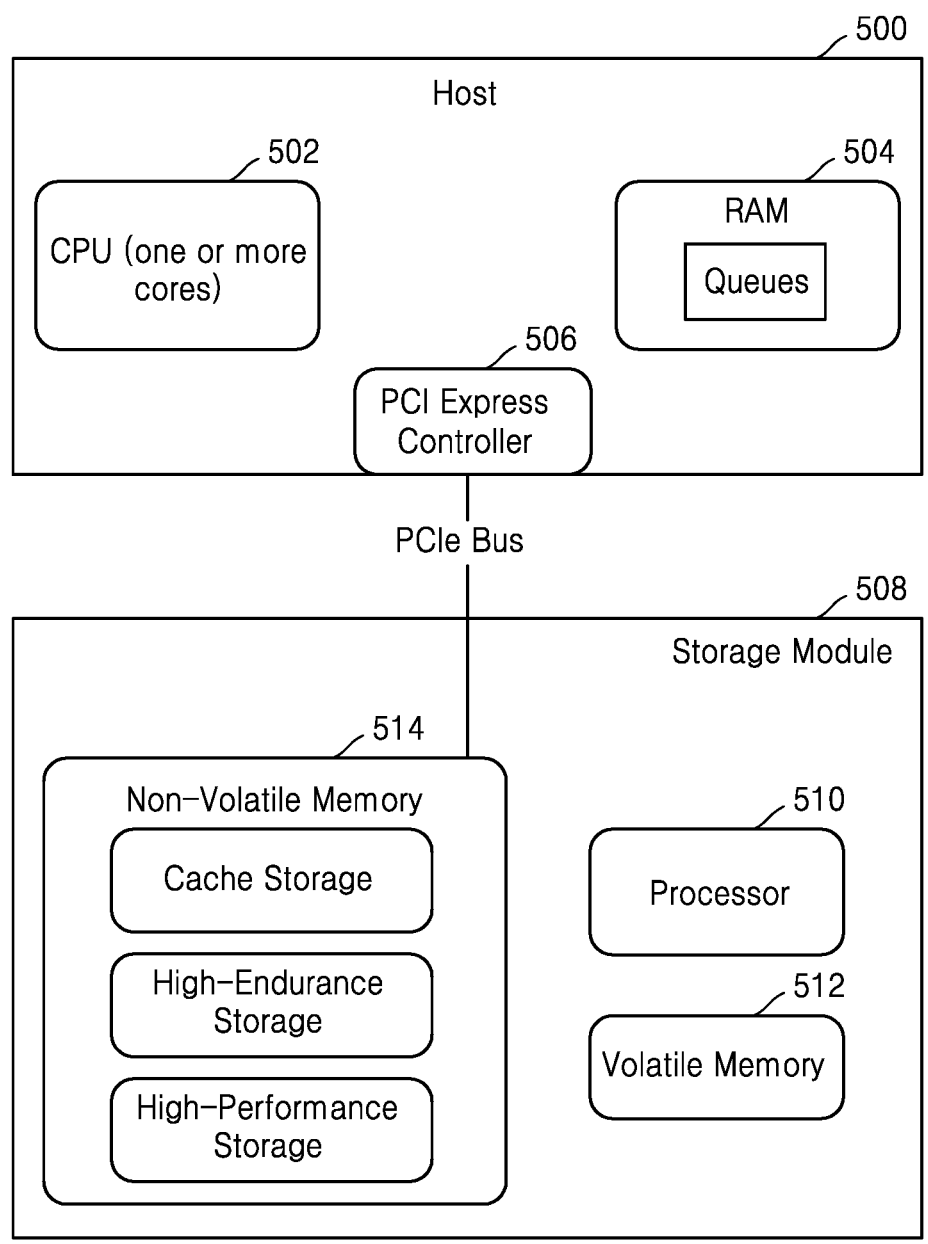
FIG. 1 illustrates a state of the art Non-Volatile Memory Express (NVMe) specification.
Figure 2:
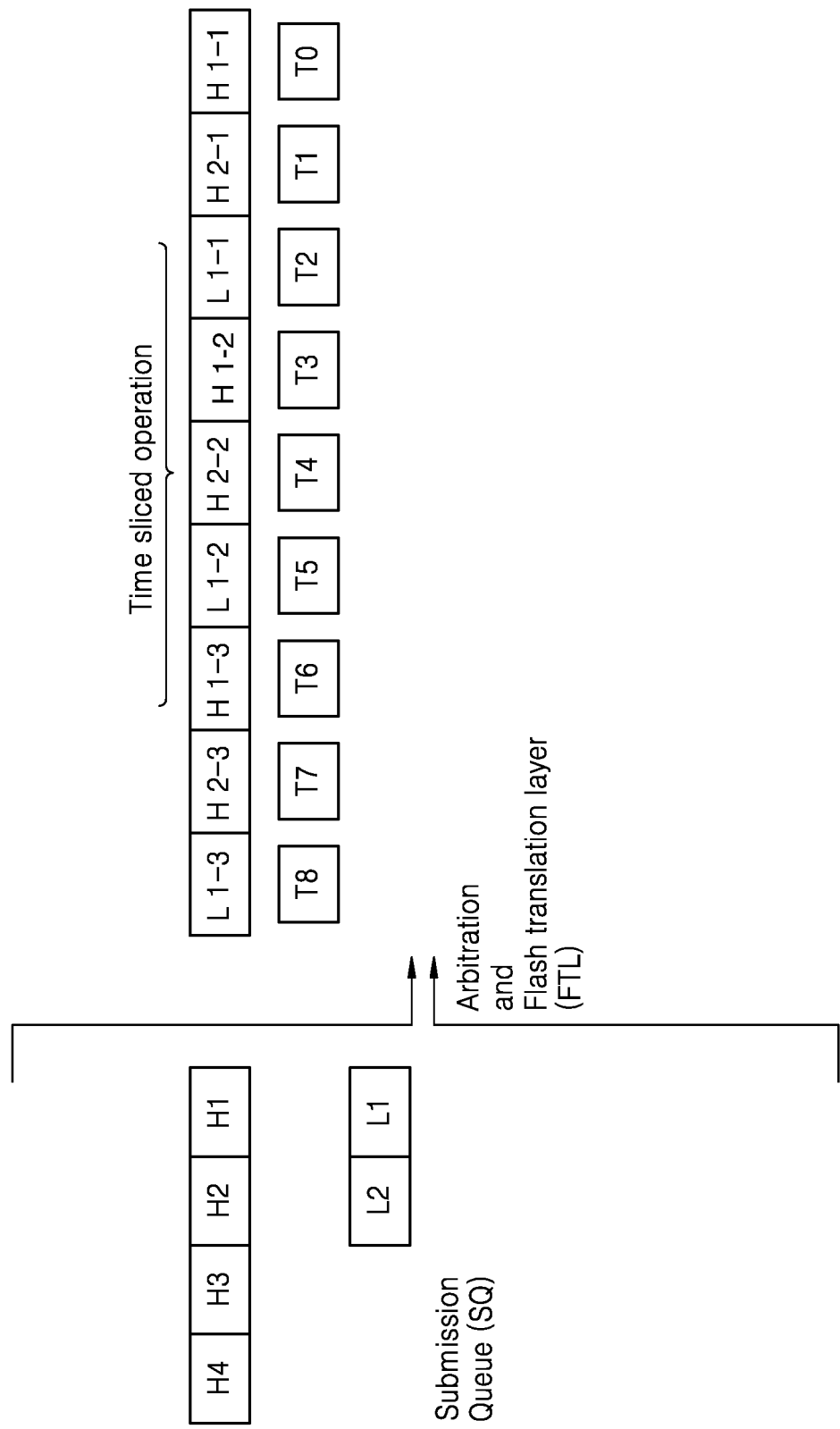
FIG. 2 illustrates state of the art time-sliced operation for processing commands.
Figure 3:
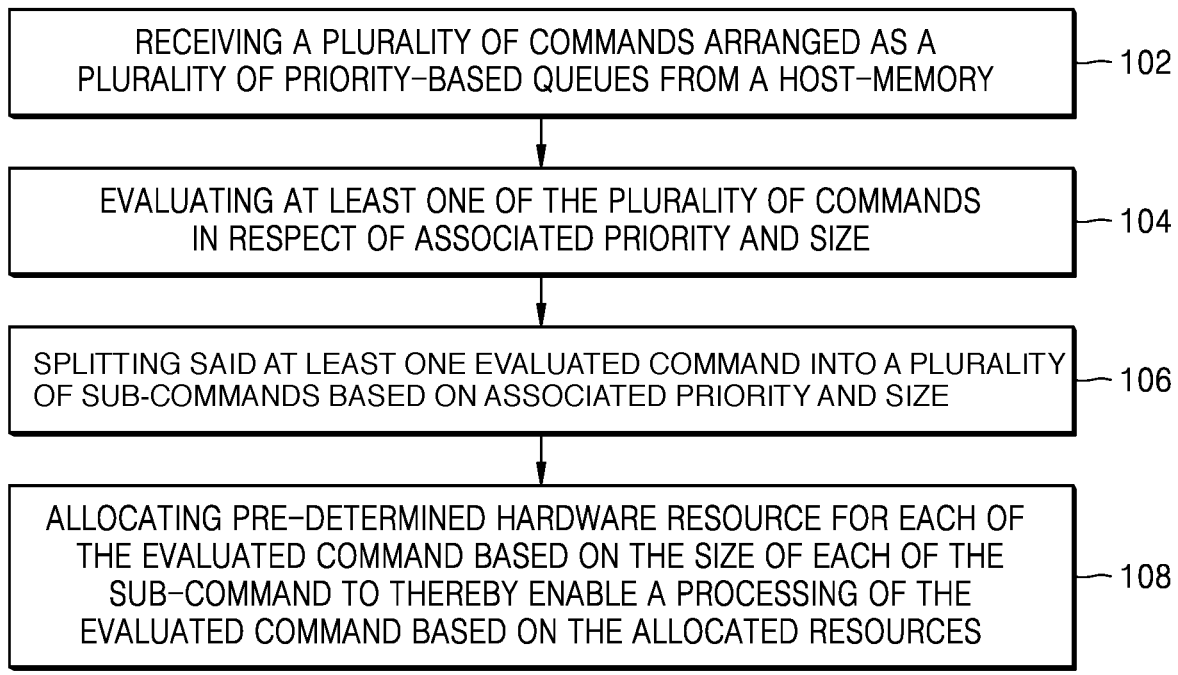
FIG. 3 illustrates method steps, in accordance with an embodiment of the invention.

FIG. 3 illustrates a method of operation of a PCIe based non-volatile memory (NVM) storage module. For example, the method of FIG. 3 may be implemented by the NVMe storage module 400 of FIG. 4, such as by processor 404 (e.g., as configured by software).

As a part of initial settings, a plurality of commands are sorted within the host-memory into submission queues (SQs) based on data-characteristics of the plurality of commands, and a weight (e.g., a priority) associated with the submission queue. The plurality of the commands are stored within the host memory as sorted, such as being stored in a corresponding submission queue to which a command has been assigned. Such sorting comprises identifying the priority-based queues in the host memory based on one or more of sequential-access, infrequently-accessed write data, temporary write data, random reads, priority-read, and priority-write. Accordingly, the plurality of commands are sorted into the submission-queues based on said identification where each of the submission-queues are provided with a corresponding priority (e.g., high, medium or low). Note that the priorities of the various submission-queues may be the same or different (e.g., several submission queues being assigned a "high" priority with others being assigned "medium" priority and others being assigned "low" priority).

The method comprises receiving (step 102) a plurality of commands arranged as a plurality of priority-based queues from a host-memory. The receiving comprises (step 104) fetching the plurality of commands stored in the submission queues from the host memory and performing said allocation of the hardware resources prior to processing of the plurality of commands.

Thereafter, at least one of the plurality of commands is evaluated (step 104) in accordance with at least one of a priority associated with the submission queue storing the command (or otherwise associated with the command), and a size of the command. The method further comprises (step 106) splitting said at-least one evaluated command into a plurality of sub-commands, each of the sub-command corresponding to a size determined in accordance with the evaluation. The splitting comprises splitting the at-least one evaluated command associated with a high priority queue into sub-commands of a substantially lower size to thereby avoid starvation to serve small transfer sized commands from other queues. Further, in an embodiment, the splitting comprises varying the sub-command size while moving from one evaluated-command to another evaluated command as a part of conducting the splitting in respect of the plurality of evaluated commands. Note that as used herein, a size of a command refers to an amount of hardware resources needed to execute the command (rather than the data transfer size of a command code (e.g., rather than a command code of "WRITE")). The size of a command need not be precisely calculated but may be estimated, such as by identifying an amount of data to be transferred as a result of executing the command. As an example, a command to read 128 KB of data may be split into 2 sub-commands to read 64 KB each (e.g., with respect to a command in a high priority submission queue as discussed elsewhere herein) or may be split into 32 sub-commands to read 4 KB each (e.g., with respect to a read command in a low priority submission queue as discussed elsewhere herein).

The method further comprises (step 108) allocating predetermined hardware resource for each of the evaluated command at-least based on the size of each of the sub-command to thereby enable a processing of the evaluated command based on the allocated resources for augmenting a Quality of service (QoS) for said evaluated command. The predetermined hardware resources may be hardware resources of the storage module 400. In an example, here hardware resources may refer to internal memory buffers that are used to move data from or to the main memory. For sub-commands obtained from splitting commands in high priority (or relatively higher priority) submission queues, the allocating comprises allocating a substantially higher quantum of hardware resources (as compared to sub-commands derived from commands from low priority (or relatively lower priority) submission queues) to the at least one evaluated command based on observing the substantially larger size of the sub-command to thereby enable the substantially faster processing of the at least one evaluated command. Such allocation of the hardware-resources may comprise allocating one or more direct memory access data migrant packets.

Upon the allocation of step 108, the method further comprises processing of each of evaluated commands in accordance with the allocated predetermined hardware resources to enable a guaranteed quality of service in accordance with the priority of the submission queue and/or size of the evaluated command.

Figure 4:
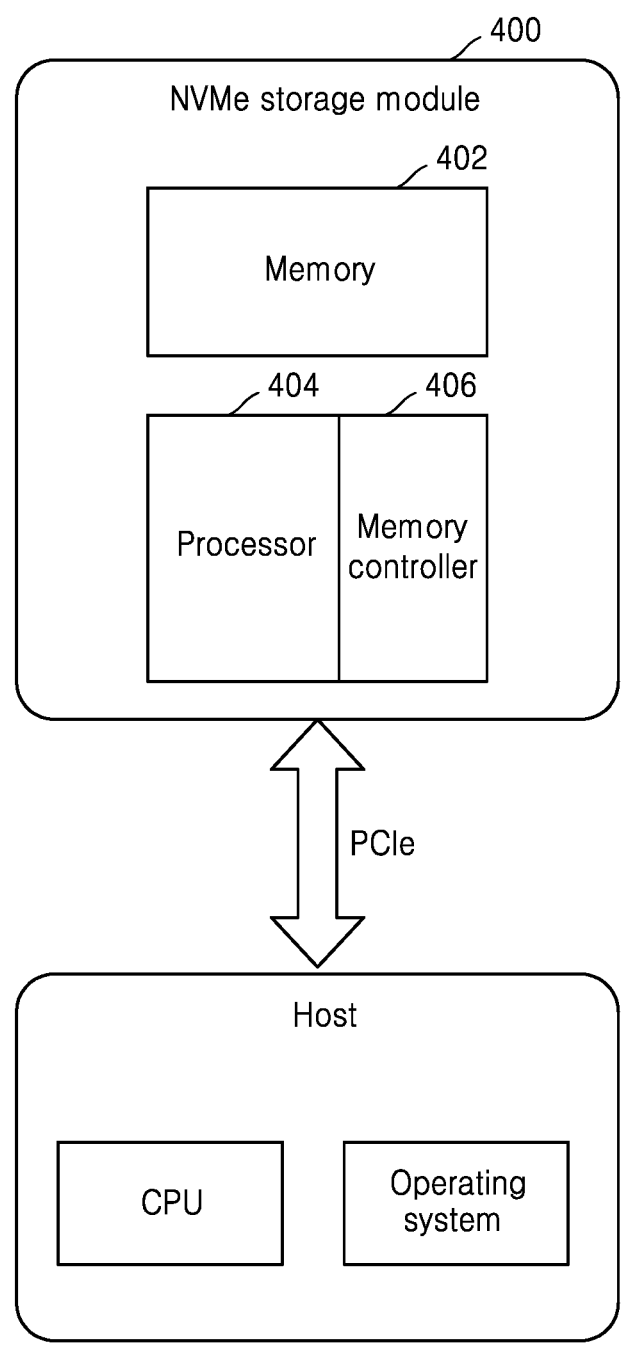
FIG. 4 illustrates a system, in accordance with an embodiment of the invention.

FIG. 4 illustrates a detailed internal-construction of a system including NVM storage module 400 in accordance with an embodiment of the present invention. The storage module 400 includes a memory 402 and a processor 404 to execute the method steps 102 to 108 of FIG. 3. Further, a memory controller 406 refers a location where the splitting of main command to the sub-commands happens. More specifically, a native command is received by the controller 406 and split into sub-commands depending on a priority queue from which the native command was fetched.

Likewise, there may be a PCIe (Peripheral Component Interconnect Express) bus connecting the NVM storage module 400 to a host that facilitates operational-interconnection between the storage module 400 and a host computing system. One or both of the storage module 400 and host may be connected to the PCIe bus through a corresponding detachable connector to be removably connected to each other. In other examples, the storage module 400 may also be integrated with the chipset of the host computing system and be embedded in the host. Although the bus and removable connector(s) may provide an interface defined by Peripheral connector interface (PCI) to connect the storage module 400 and host, other interface standards may be used for the bus and removable connector(s) such as Serial ATA (SATA), Parallel ATA (IDE), and Universal Serial Bus (USB).

In some examples, the storage module 400 is a solid-state drive. The plurality of commands to be executed originate from (and received from) an operating-system forming a part of the host computing system (host), or a virtual operating system executed as a guest operating system and operating through a server/hypervisor. In other examples, the host corresponds to either a client or server computing system.

Figure 5:
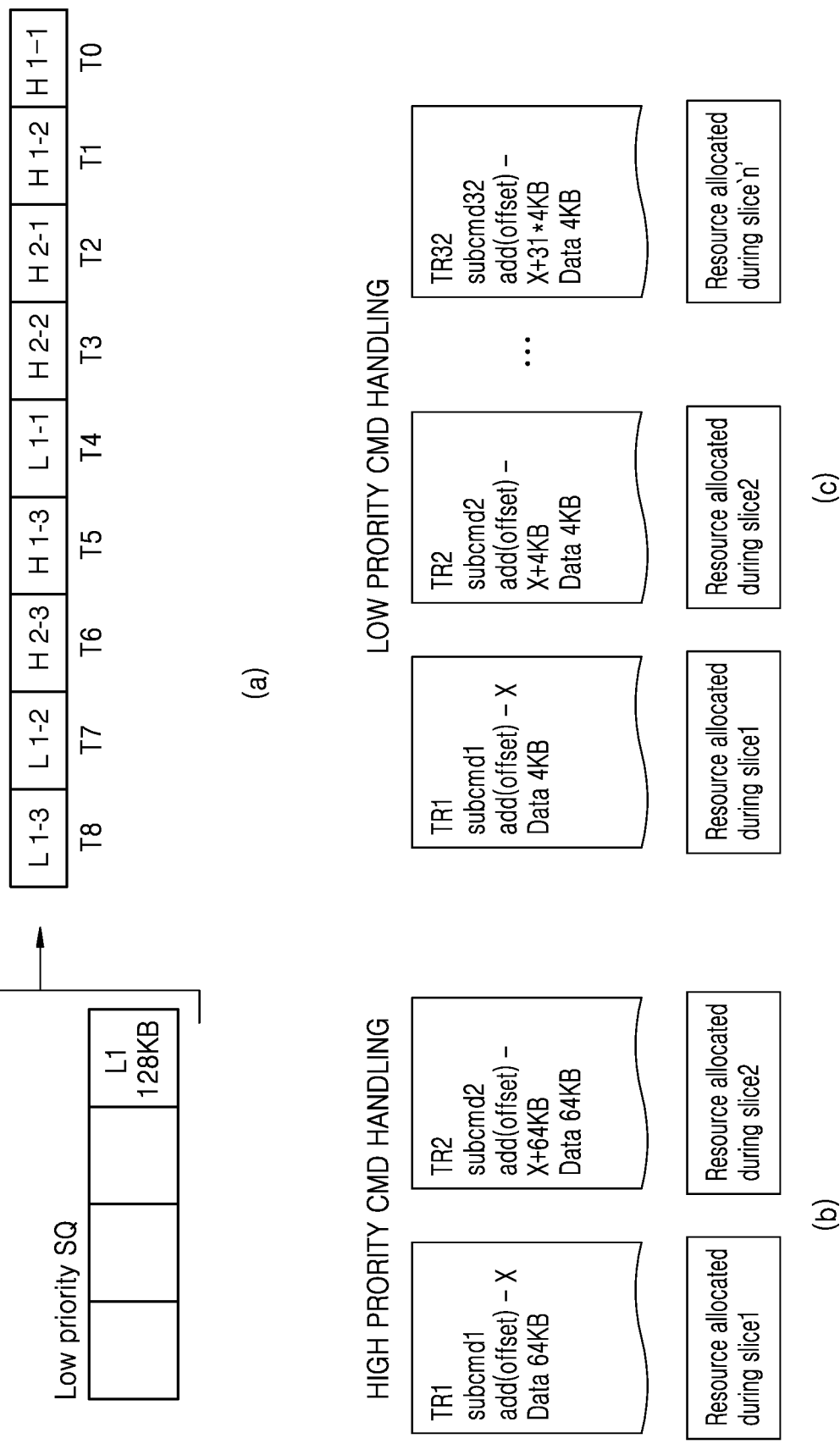
FIG. 5 illustrates an example operation of priority-based command handling, in accordance with an embodiment of the invention.

FIG. 5 illustrates an implementation an example implementation depicting operation in accordance with the present subject matter.

As may be understood, the processing of the evaluated-commands comprises arranging a plurality of time-slices for the sub-commands in a sequence determined by the corresponding priority associated with each of the sub-commands. Such processing of each of sub-commands is done in accordance with a position of the sub-command within the sequence, wherein each of the time-slice corresponds to duration of processing of each of the sub-command. The time-slice of a lower priority command enables initiation of the processing of the lower-priority command at an instant wherein the processing of a higher-priority command is approaching completion.

Portion (a) of FIG. 5 relates to a generic representation of splitting into the sub-commands. Portion (b) and (c) of FIG. 5 consider a fixed 128 KB of incoming command in a high priority or low priority queue and corresponding allocation of resources and the amount of data that is transferred every time when a high priority or low priority command is being serviced. In an example, a high priority command refers to a command serviced in a given slot of 64 KB for being processed by a data transfer engine and a low priority command refers to a command serviced in a given slot of 4 KB for being processed by a data transfer engine.

In an example scenario referring examples of a "command" (received from host) and the resulting "sub-commands" generated by storage module, a burst read scenario may be envisaged. In a burst read operation, a single burst read command can be considered implemented by a sequence of internal sub-commands, where each internal sub-command corresponds to an internal read operation of a row.

In another example scenario referring examples of a "command" (received from host) and the resulting "sub-commands" generated by storage module, the memory controller (406) may convert a command from the host to read a large block of data into a series of read commands to read from individual memory chips.

An example scheduling of processing or a time-itinerary has been depicted in portion (a) of FIG. 5 wherein it may be seen that commands forming a part of submission queues (SQ) are executed in a time-sliced operation. Time slices (T0, T1, T2 . . . T8 . . . ) may have the same duration and may be sequential to and immediately following one another. In the example of portion (a) of FIG. 5, a high priority SQ (submission queue) contains commands H1, H2, H3 and H4 while a low priority SQ (submission queue) contains commands L1, L2, L3 and L4. The commands H1, H2, H3 and H4 and L1, L2, L3 and L4 may be received by the storage module from an external source (e.g., the host) (e.g., for each submission queue SQ, in the order shown in FIG. 5). FIG. 5 shows some of the sub-commands generated by the storage module by splitting commands H1, H2, H3 and H4 and L1, L2, L3 and L4. The sub-commands shown in FIG. 5 include H1-1, H1-2, H2-1, H2-2, L1-2, H1-3, H2-3 and L1-3 which are assigned to time slices T0 to T8, respectively. The sub-commands may have the same format as the commands from which they are formed (e.g., same as corresponding one of commands H1, H2, H3, H4, L1, L2, L3 and L4). For example, assume externally received command H1 is a read command. In forming sub-commands H1-1, H1-2 and H1-3 from externally received command H1, the same command code (here command code for read) may be used, while address information (e.g., start address, end address or start address and a length)) may be derived from the address location information received with command H1. Thus, the sub-commands may be decoded and operated on by hardware resources in the same manner as if they had directly received command H1. In contrast to the state of the art, the implementation of FIG. 5 depicts consideration of priority while processing commands. As may be seen, the commands H1, H2, H3, H4, L1, L2, L3 and L4 are divided into various portions (e.g., divided into sub-commands) and thereafter execution is timed in a manner such that majority of divided-portions of the high priority commands such as H1-1, H1-2, H2-1, H2-2, H1-3, H2-3 are scheduled for processing prior to a majority of the divided-portions of the low-priority commands i.e. L1-2, L1-3 (and other (not shown) subcommands obtained from dividing low-priority commands L1, L2, L3 and L4).

Portion (b) of FIG. 5 illustrates an example high-priority command handling scenario, wherein a data transfer of 64K per time slice is executed with respect to a higher-priority queue, i.e. H1, H2, H3, H4. Accordingly, in this example of hardware allocation, more hardware is allocated to time slices assigned to commands of the high priority submission queue to allow data transfer of 64 KB during a time slice. Therefore, when executing high priority sub-commands (e.g., H1-1, H1-2, etc.) during a time slice, the larger hardware allocation provides a larger data transfer.

More specifically, Portion (b) of FIG. 5 illustrates that each high priority command will be given more time slots when getting processed, whereas low priority commands will be given less time slot to do its data transfer. Time slots may be related with the resources allocation. In an example, the high priority commands will be given more resources hence it takes 2 time slots when getting processed. Whereas low priority commands are given less resources hence it can operate only for 1-time slot duration and needs multiple later time slots to complete a low priority request.

Portion (c) of FIG. 5 illustrates an example low-priority command handling scenario, wherein a data-transfer of 4

KB per time slice is executed with respect to an example lower-priority queue, i.e. L1, L2, L3, L4. Accordingly, in this example of hardware allocation, relatively less hardware is allocated to time slices assigned to commands of the low priority submission queue to provide a relatively lower data transfer of 4 KB per time slice. In this example, for a total data transfer of 64 KB, only 2 time slices are needed to complete a 64 KB data transfer for high priority submission queue commands whereas 32 time slices are needed to complete a 64 KB data transfer for low priority submission queue commands.

Note that reference to "slice 1," "slice 2," . . . "slice n" in portions (b) and (c) of FIG. 5 do not necessarily correlate to the time slices T0 . . . T8 illustrated in portion (a) of FIG. 5, but merely represent a relative order of operation slices for a high priority submission queue (in portion (b)) and a relative order of operation slices for a low priority submission queue (portion (c)) which is dependent on the amount of data transfer of incoming command.

In an implementation, aforesaid consideration of command slicing operation may not amount to holding resources for low-priority queue for a longer time compared to high. After every time slice operation, resources may be released to the free pool. Before going to the next time-slice operation for low priority command, it may be ensured that a new high priority command presence takes precedence over the partially completed low priority command to use resources from the free pool.

Overall, along with fetching the commands based on order of priority, the present implementation aims at providing priority while executing the commands as well. The data transfer for a command is processed in a time sliced operation with a common pool of resources based on the size of the command. By providing more hardware resources to process a command from a high priority queue at any point of time during the allotted time slot compared to that of a command from low priority queue, the latency of high priority command may be reduced further and an enhanced QoS is attained.

Likewise, the present implementation may be extended to cover such scenarios wherein there are present multiple high-priority queues, i.e. queues belonging to the same class but with respect to different applications such as App 1, App 2, App 3. Herein the priority may be decided based on the application needs, i.e. high priority app, real time app, best-effort app. Overall, the present subject implementation may effectively handle the scenario wherein multiple queues of same priority or a same class are present. By command slicing and allocating the hardware resources based on magnitude of the sliced command (i.e., based on magnitude of the sub-command), the present subject matter's executed queue handling duly considers the time required by a time-critical application when submitted via a particular-queue.

The present implementation may operate with ease with any standard/optimized input output (I/O) scheduling mechanism known in the realm of computing systems. As may be understood, the Load Scheduling algorithms are expensive with respect to its computation-cost as it involves multiple computational-factors, e.g. know-how of configuration of multiple VM machines, current load on a virtual machine (VM), time taken to complete an I/O operation. By working in tandem with any standard/optimized input output (I/O) scheduling mechanism and appropriating said computational factors as a part of processing, the present subject matter governed by method steps of FIG. 3 is able to work the standard Load Scheduling algorithms to its substantial advantage.

Figure 6:
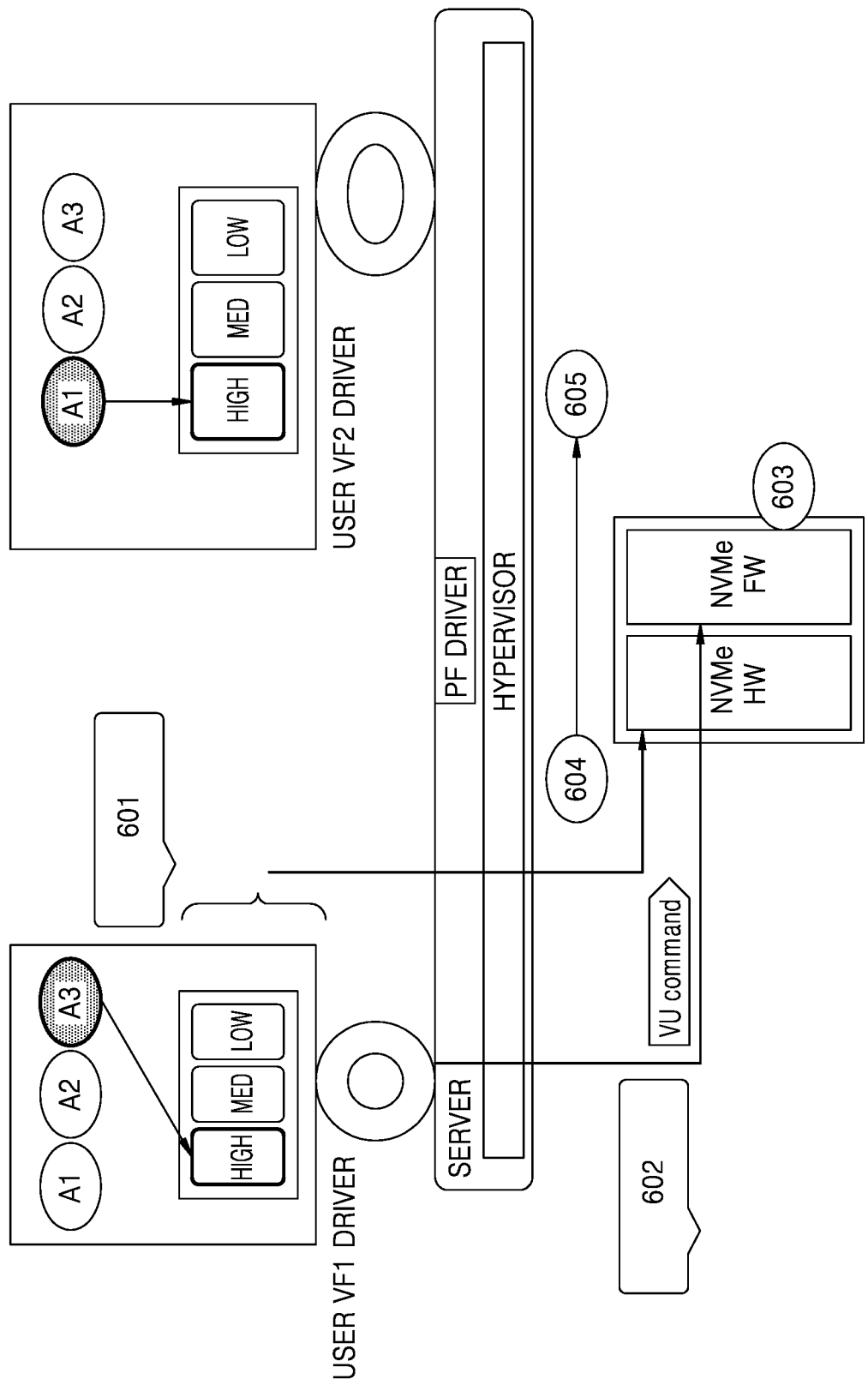
FIG. 6 illustrates an example-implementation of method steps of FIG. 3 in a virtualized-environment, in accordance with an embodiment of the invention.

FIG. 6 illustrates an exemplary implementation and operation in accordance with the present invention. In this example, commands are handled in a virtualized-environment, where there could be multiple high priority queues in a virtualized-environment. Selecting a particular queue based on application requirements may be achieved with the help of driver of a guest operating system sending a VU-command or a trigger to a storage module. The storage module may implement the method steps of the disclosed herein to achieve a desired allocation of resources for the guest system.

Step 601 represents submission of critical-app requests from any host in a virtualized environment. The submission command-queue entries in the particular host in the virtualized environment may themselves be prioritized into various-queues such as "low", "medium" and "high" as per the standard-procedures. As shown in the example, the "high" rated queue may pertain to the A3 or the Application 3.

At step 602, each host in the virtualized environment sends a VU command (i.e. a trigger) to request the storage module for a special-handling of the "high" priority rated queue.

At step 603, the firmware (FW) forming a part of the NVMe storage module within the "hypervisor" processes the VU command and initiates the method-steps of FIG. 3.

At step 604, various queues prioritized as "low", "medium", "high" are fetched from the priority queue of VF1 in accordance with the method-step 102 of FIG. 3.

At step 605, the "high" rated command queue is serviced with more resources or allocated DMA in accordance with the method-steps 104 through 108 of FIG. 3.

Figure 7:
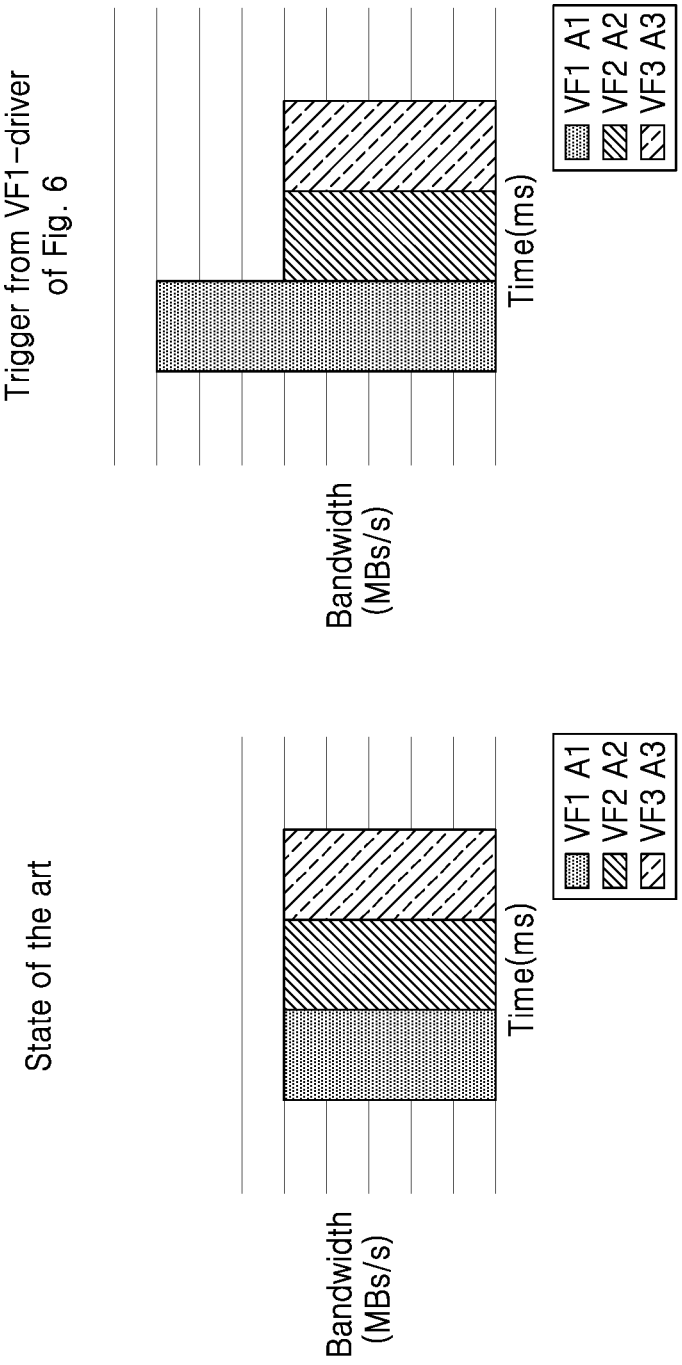
FIG. 7 illustrates statistics representing example results of method-steps of FIG. 3, in accordance with an embodiment of the invention.

FIG. 7 illustrates exemplary bandwidth statistics (in megabytes per second (MBs/s)) representing example results of method-steps of FIG. 3, in accordance with the embodiment of the invention. The left side of FIG. 7 shows the bandwidth achieved by allocating the same amount of hardware resources for each of three time slices remains the same for each of the three time slices, whereas the right side of FIG. 7 shows the bandwidth achieved varies between three time slices by allocating different amounts of hardware resources among the time slices.

The left side of FIG. 7 depicts the conventional or state of the art scenario wherein the allocation of the resources and consequently the allocated bandwidth remains the same for all virtual-machines (VM1, VM2, VM3) linked to the hypervisor despite the differently prioritized command queues present as submission queues. As may be observed from the left side, the bandwidth is equally divided among three requestor VM1, VM2, and VM3.

On the other hand, as shown on the right side of FIG. 7, it is evident that the VFI of the right side of FIG. 7 (as depicted in FIG. 6) is allocated more-resources than VF2 because of the raised trigger by VF1 for servicing its "high" priority queue in accordance with this embodiment. Now, since VM1 is given high priority, the bandwidth is high for that particular requestor VM1 and the other 2 requests to VM2 and VM3 are proportionally adjusted to the match total bandwidth.

Figure 8:
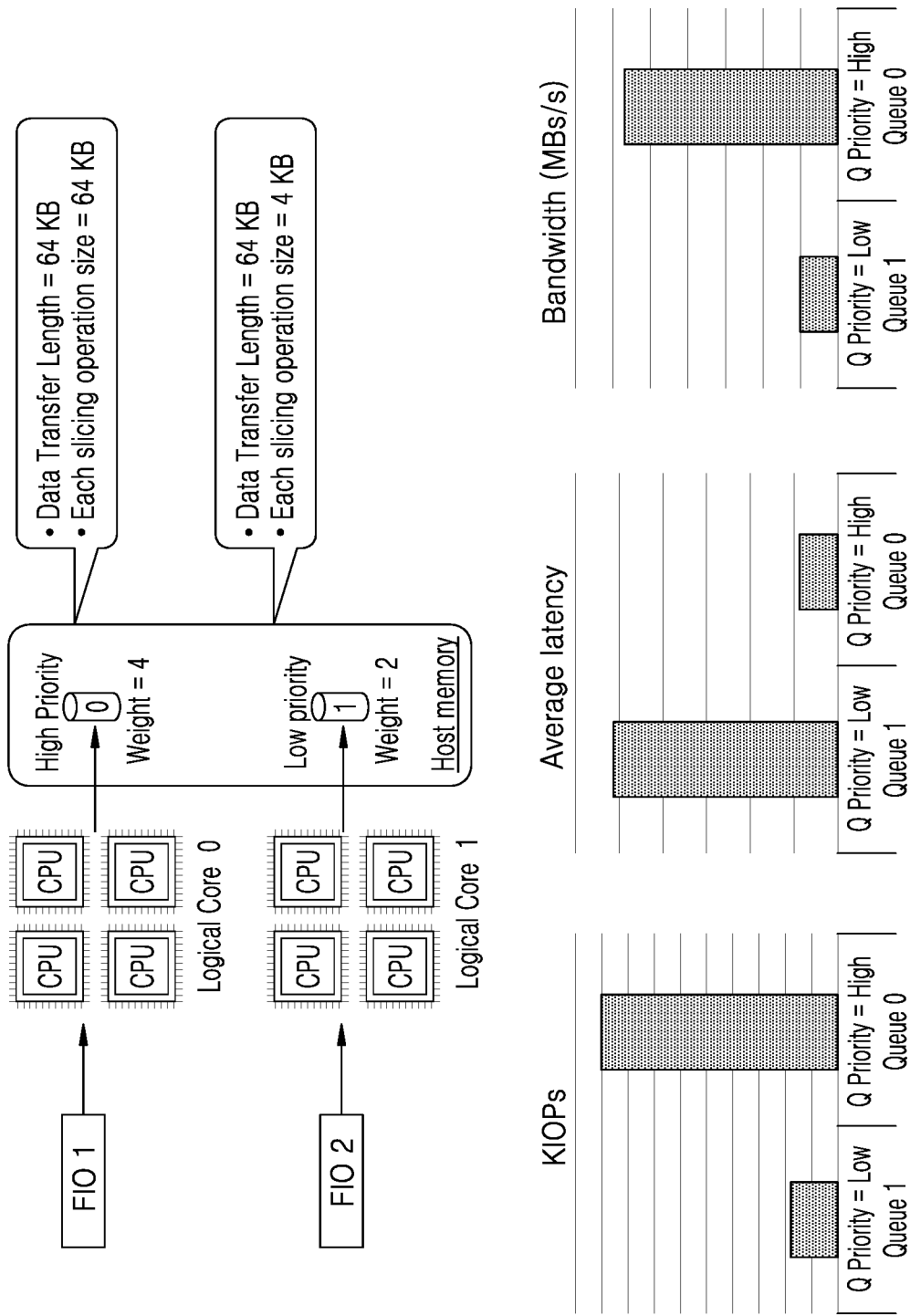
FIG. 8 illustrates other set of statistics representing example results of method-steps of FIG. 3, in accordance with an embodiment of the invention.

FIG. 8 illustrates other set of statistics representing exemplary results of method-steps of FIG. 3, in accordance with an embodiment of the invention. More specifically, the experimental results shown in present figure pertains to a 128 KB read command. The results may be determined by a flexible input/output (FIO) tester that illustrates a number of threads or processes doing a particular type of I/O action as specified by the user. As may be understood, a typical use of FIO tester is to write a job-file matching the I/O load one wants to simulate.

As may be understood, Key input/output per second (kIOPs) is one of the key performance parameter for the storage system such as NVMe. The other parameters are the latency (in µs or ms), and the throughput (MB/s). As evident from the simulation-results of application of FIO 1 corresponding to "high" priority command queues and application of FIO2 for "low" priority command queues, the kIOPs, and throughout determined by FIO1 are found to be substantially higher than FIO2. On the other hand, latency determined by FIO2 is found to be substantially higher than FIO1.

Figure 9:
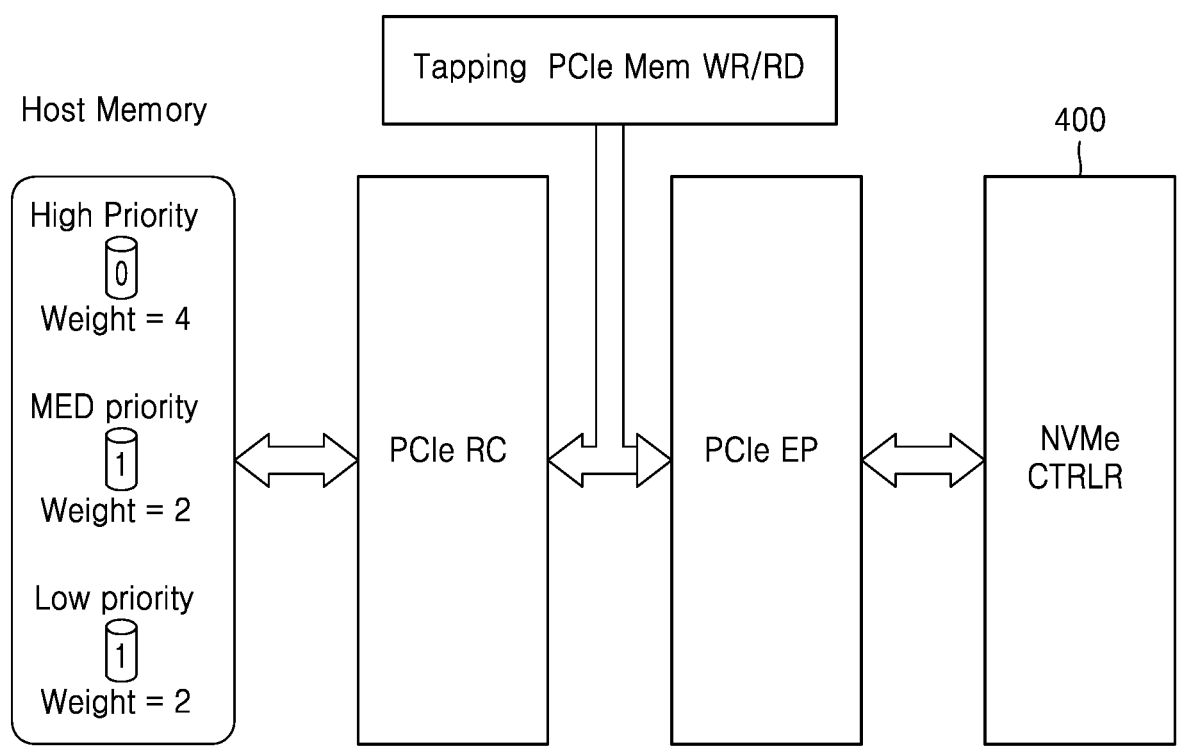
FIG. 9 illustrates example real-time operation of method steps of FIG. 3, in accordance with an embodiment of the invention.

FIG. 9 illustrates example real-time operation of method steps of FIG. 3, in accordance with the embodiment of the invention.

During said operation, commands of same size with example known PRP/SGL addresses may be populated based on "priority" of queues within the host memory buffer. In an example, the PRP/SGL addresses differ across the differently prioritized queues.

Along with fetching the commands based on order of priority, the present subject matter may provide priority while executing the received commands as well (e.g., while executing commands as provided from an external source, such as a host). The data transfer for a command is processed in a time sliced operation with a common pool of resources based on the size of the command. In addition, by providing additional hardware resources to process a command from a high priority queue at any point of time during the allotted time slot compared to that of a command from low priority queue, the present subject matter may reduce the latency of a high priority command to thereby enhances the QoS. In some examples, there may be multiple high priority queues in a virtualized environment, where the selection of a particular-queue for hardware allocation is achieved at least with the help of driver of the guest device (i.e. VF1) sending a VU command or other trigger to the system (e.g., host and storage module incorporating the method steps of FIG. 3).

We claim:

1. A method of operation of a non-volatile memory (NVM) storage module, said method comprising:
  receiving a plurality of commands each associated with a corresponding priority from a host;
  for each received command, determining at least one of the corresponding priority and a size of the command;
  for at least some of the received commands, splitting the received command into a plurality of sub-commands in accordance with at least one of:
    the corresponding priority associated with the command, and
    the size of the command; and
  allocating hardware resources for each of the received commands that have been split based on the size of each of the corresponding sub-commands of the received command to thereby enable a processing of the received command based on the allocated resources,
  wherein the size of the sub-commands is based on the corresponding priority of the corresponding received command, and
  wherein a relatively higher priority received command is split into sub-commands of a first size and a relatively lower priority received command is split into sub-commands of a second size that is smaller than the first size.

2. The method as claimed in claim 1, further comprising:
  sorting the plurality of commands within the host into submission queues the submission queues having a corresponding priority; and
  storing the plurality of the commands within a host memory in accordance with the sorting.

3. The method as claimed in claim 2, wherein said sorting comprises, for each command, placing the command into a selected one of the submission queues based on one or more of:
  sequential-access, infrequently-accessed write data, temporary write data, random reads, priority-read, and priority-write being associated with the command.

4. The method as claimed in claim 2, further comprising:
  processing of each of received commands in accordance with the allocated hardware resources to enable a quality of service (QoS) in accordance with the priority of the submission queue.

5. The method as claimed in claim 4,
  wherein the receiving the plurality of commands from the host and the allocating of the hardware resources is performed prior to processing of each of the received commands.

6. The method as claimed in claim 1, wherein said splitting comprises splitting a first command and a second command of the plurality of received commands, wherein the first command is determined to be associated with a first priority and is split into first sub-commands of a first size and the second command is determined to be a second priority and is split into second sub-commands of a second size,
  wherein the first priority is higher than the second priority, and
  wherein the first size is larger than the second size to thereby enable a substantially faster processing of the first command relative to the processing of the second command.

7. The method as claimed in claim 6,
  wherein said allocating comprises allocating more hardware resources to each of the first sub-commands than to each of the second sub-commands based on identification of the larger size of the first sub-commands to thereby enable the substantially faster processing of the first command as compared to the second command, and
  wherein said allocation of the hardware resources comprises allocating one or more direct memory access data migrant packets.

8. The method as claimed in claim 6, wherein said allocating comprises allocating the hardware resources for each of the first sub-commands and second sub-commands to complete tasks of the first sub-commands and second sub-commands within corresponding time slices of equal duration.

9. A non-volatile memory (NVM) storage module comprising:
  a memory; and
  a processor configured to:
    receive a plurality of commands each associated with a corresponding priority from a host,
    for each received command, determine at least one of the corresponding priority and a size of the command, for at least some of the received commands, split the received command into a plurality of sub-commands in accordance with at least one of:
   the corresponding priority associated with the command, and
   the size of the command, and
allocate hardware resources for each of the received commands that have been split based on the size of each of the corresponding sub-commands of the received command to thereby enable a processing of the received command based on the allocated resources,
wherein the size of the sub-commands is based on the corresponding priority of the corresponding received command, and
wherein a relatively higher priority received command is split into sub-commands of a first size and a relatively lower priority received command is split into sub-commands of a second size that is smaller than the first size.

10. The storage module as claimed in claim 9, wherein the processor is configured to receive the plurality of commands as sorted into submission queues of different priorities.

11. The storage module of claim 10, wherein the submission queues are classifiable based on one or more of:
   sequential access, infrequently-accessed write data, temporary write data, random reads, priority-read, and priority-write.

12. The storage module of claim 9, wherein the storage module comprises a connector to provide a removable connection to the host, the connector being defined by one of the following standards:
   Peripheral connector interface (PCI),
   Serial ATA (SATA),
   Parallel ATA, and
   Universal Serial Bus (USB).

13. The storage module of claim 9, wherein the storage module is embedded in the host.

14. The storage module of claim 9, wherein the storage module is a solid-state drive (SSD).

15. The storage module of claim 9, wherein the plurality of commands correspond to commands provided by at least one of:
   an operating system corresponding to the host; and
   a virtual operating system executed as a guest operating system by the host.

16. The storage module of claim 9, wherein the host comprises a client or server computing system.

17. A storage system comprising the storage module of claim 9, a host and a bus connecting the host and the storage module.

18. The storage module of claim 9,
   wherein the processor is configured to split a first command and a second command of the plurality of received commands, determine that the first command is associated with a first priority and, in response thereto, to split the first command into first sub-commands of a first size and to determine that the second command is associated with a second priority and, in response thereto, to split the second command into second sub-commands of a second size,
   wherein the first priority is higher than the second priority, and
   wherein the first size is larger than the second size to thereby enable a faster processing of the first command relative to the processing of the second command.

19. The storage module of claim 18,
   wherein the processor is configured to allocate more hardware resources to each of the first sub-commands than to each of the second sub-commands based on identification of the larger size of the first sub-commands to thereby enable the substantially faster processing of the first command as compared to the second command.

20. The storage module of claim 18, wherein the processor is configured to allocate hardware resources for each of the first sub-commands and second sub-commands to complete tasks of each of the first sub-commands and second sub-commands within corresponding time slices of equal duration.

* * * * *